United States Patent [19]

Elsässer

[11] Patent Number: 4,542,877
[45] Date of Patent: Sep. 24, 1985

[54] SUPPORT SPRING BLOCKING STRUCTURE, AND SPRING-STRUCTURE COMBINATION

[75] Inventor: Friedrich Elsässer, Keltern, Fed. Rep. of Germany

[73] Assignee: Witzenmann GmbH Metallschlauch-Fabrik Pforzheim, Pforzheim, Fed. Rep. of Germany

[21] Appl. No.: 581,095

[22] Filed: Feb. 17, 1984

[30] Foreign Application Priority Data

Apr. 26, 1983 [DE] Fed. Rep. of Germany ....... 3315076

[51] Int. Cl.[4] ............................................. F16M 1/00
[52] U.S. Cl. .................................... 248/561; 248/563; 248/613
[58] Field of Search ............... 248/561, 563, 243, 613; 267/170, 177, 178, 615, 167, 71, 72; 108/108, 106, 152

[56] References Cited

U.S. PATENT DOCUMENTS 2,713,982 7/1955 Sherbrooke ..................... 248/563 X
2,936,142 5/1960 Sherburne ....................... 267/178 X
3,148,870 9/1964 Suozzo ............................. 267/71 X

FOREIGN PATENT DOCUMENTS 3026319 2/1982 Fed. Rep. of Germany .
1537254 12/1978 United Kingdom ............... 248/561

Primary Examiner—Ramon S. Britts
Assistant Examiner—David M. Purol
Attorney, Agent, or Firm—Frishauf, Holtz, Goodman & Woodward

[57] ABSTRACT

An essentially tubular spring housing (FIGS. 5, 6) is formed with longitudinal slits (8d, 8e) into which the support spring blocking structure (1, 10) can be assembled. The support spring blocking structure, in one form (FIGS. 1, 2) is a longitudinal rail retaining a plurality of stacked blocking plates (2) therein, between abutments (3, 4) which are spaced wider than the length of the stack of plates (2) to permit engagement of a spring plate (7) between selected blocking plates, and thus lock the spring plate, and hence the spring, in selected position. In another embodiment (FIGS. 3, 4), the stacked plates (9) are slidable in a holder band or strip (10a). The holders (1a, 10a) are formed with a longitudinal, externally projecting holding hook (5, 11) to permit storing the blocking structure on the spring holder (right side, FIGS. 5, 6) in readily accessible position.

16 Claims, 8 Drawing Figures

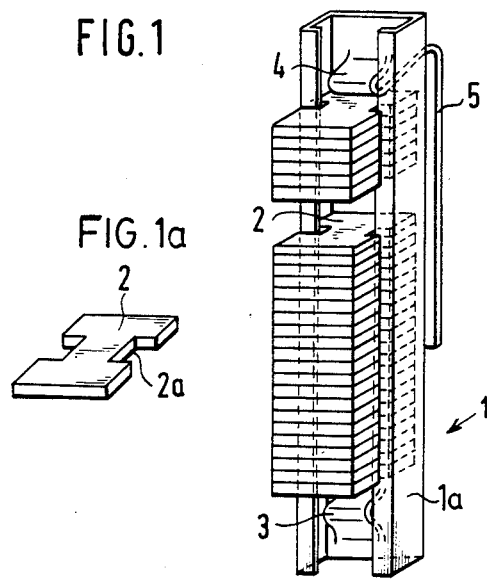
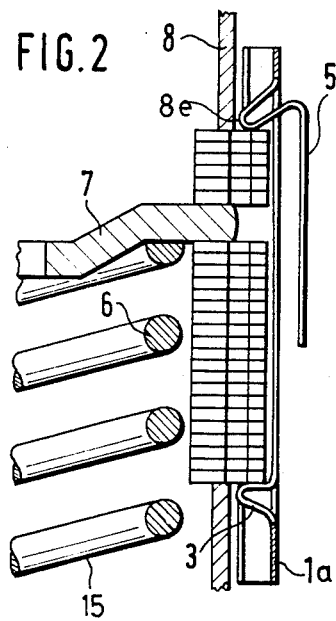
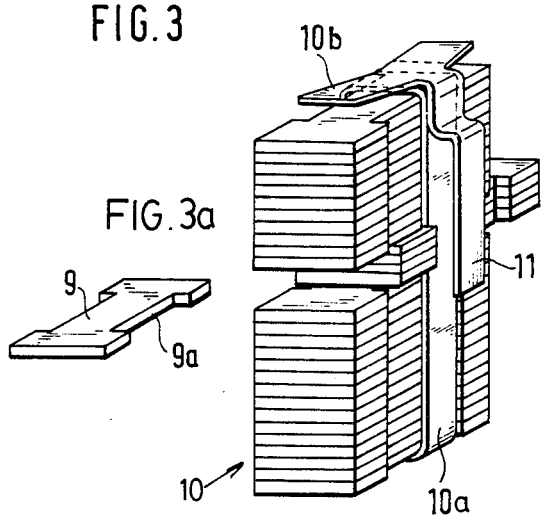
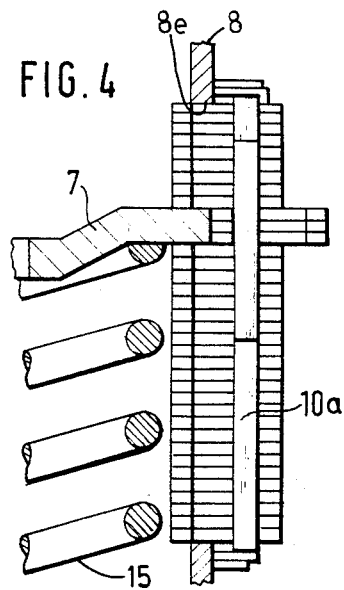

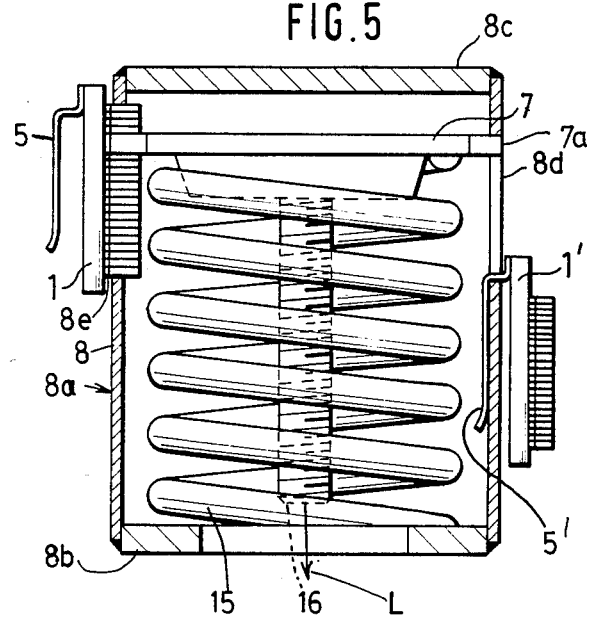
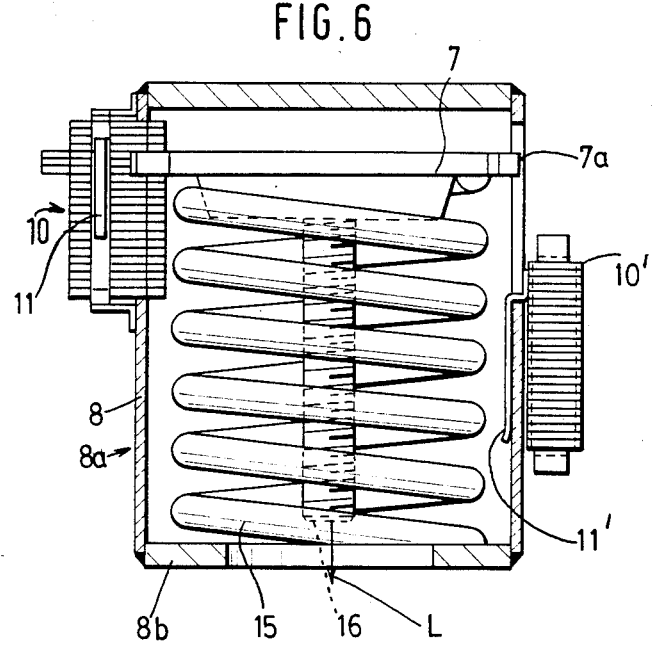

SUPPORT SPRING BLOCKING STRUCTURE, AND SPRING-STRUCTURE COMBINATION

Reference to related publication
German Patent Disclosure Document DE-OS No. 30 26 319, HARDTKE.

The present invention relates to support elements including springs, particularly suitable to support hydraulic pipes, support troughs and the like, either in suspended position, or, resiliently, from a support located on a base.

BACKGROUND

It has previously been proposed—see, for example, the referenced German Patent Publication Document DE-OS No. 30 26 319, HARDTKE, to locate a support spring within a housing and, if it is required to place the spring in a predetermined position, based on weight placed on the spring, to block further movement of the spring by a blocking element which can be placed in interfering position with the spring. Spring supports, whether designed for suspension of a load from the spring, or to support a load from a base, frequently must be locked in a predetermined position, with a predetermined bias stress placed on the spring. Blocking of the spring substantially simplifies mounting of the spring holder or support. The spring can be prestressed, for example before assembling the load thereto, for a loading which corresponds at least approximately to that to which it will be subjected. This permits locating the spring holder in a position with respect to a support element which corresponds at least approximately to that which it should have when the load is suspended from the spring. Supporting a load that way has the advantage that the spring support holder itself can be adjusted, for example by a suitable adjusting screw connection or the like, to support the load at predetermined levels while permitting resilient deflection in case of changes of the load, under vibration conditions or the like. The predetermined level may well be required in order to permit, for example, gravity flow through a pipe suspended from the spring support. Prestressing the spring, and locking the spring in a certain position, or leaving the spring unstressed and locking it in position, may be suitable for certain applications. Furthermore, at times it is desirable to provide a setting for a maximum excursion of the spring, for example when testing the load suspension or, for example, when the spring support is used to maintain a pipe line under a pretermined condition, and the pipe line, to test tightness and pressure acceptance, is subjected to a fluid which may be heavier than that with which it is intended to be used in service. Blocking the excursion of the spring under such loading conditions then prevents overloading of the spring and possible damage thereto.

The referenced German Patent Disclosure Document DE-OS No. 30 26 319 discloses the use of a plurality of segments which are stacked on a common axis and which are pivotable about the common axis, for example formed by a bolt. Upon pivoting, one or more of the stacked segments can be placed in interfering position with respect to the spring, or an element coupled thereto. Use of a blocking device as there described requires measuring the deflection, for example of an end plate secured to the spring, under predetermined loading conditions. This measurement then must be transferred to the stack of segments so that that one of the segments which has the appropriate height with respect to the end plate of the spring can be deflected into an interfering position with respect to the end plate, and thus hold it in place. After this measurement and setting is carried out, the spring, typically a spiral spring located in a tubular housing forming the spring support, can then be assembled with an external hanger and a load.

THE INVENTION

It is an object to improve a spring support element and a blocking arrangement therefor which is easier to use, cheaper to make, and, further, which can be arranged to be self-adjusting for predetermined positions of the spring, under various deflection conditions, or an end plate coupled to the spring than prior art structures.

Briefly, the spring, typically a spiral spring, is located in a tubular housing, bearing with one end against an inside wall or flange of the housing, and having its other or free end secured to a spring plate. A load can be coupled to the spring plate, for example suspended therefrom, or placed thereon, which, upon application to the spring plate, tends to deflect the spring from a quiescent position to a deflected position. In accordance with a feature of the present invention, a support spring blocking structure is provided which is formed by a plurality of stacked holding plates which can be positioned in interfering relation with respect to the spring plate, but being movable out of interfering relation with respect thereto in a sliding movement, either transversely with respect to the spring plate or longitudinally of a holder, so that the spring plate then will move respective ones of the holding plates within a plate holder having defined end portions. The plate holder structure itself is removably attachable to the tubular housing, to, either, so locate the holding plates that they can be placed in interfering position, or to entirely remove the structure from a region of interfering position, for example by hooking it over the outside of the tubular housing of the spring, when not needed, to be close to the spring holder, however, and accessible whenever required. The plate holder structure and the holding plates themselves are so dimensioned and located with respect to each other that they permit sliding movement of the holding plates in the plate holding structure.

DRAWINGS

FIG. 1 is a pictorial view of a blocking structure in accordance with the present invention, removed from a spring holder;

FIG. 1a is a pictorial view of a plate element used in the structure of FIG. 1;

FIG. 2 is a fragmentary axial cross-sectional view through a spring holder, spiral spring, and blocking structure, assembled together;

FIG. 3 is a pictorial view of another embodiment of a blocking structure;

FIG. 3a is a pictorial view of a sliding plate used in the embodiment of FIG. 3;

FIG. 4 is a fragmentary half-axial sectional view similar to FIG. 2, but utilizing the structure of FIG. 3;

FIG. 5 is a vertical axial cross-sectional view through a spring holder, showing a blocking structure of FIGS. 1 and 2 in position, and another blocking structure, in storage position; and FIG. 6 is a view similar to FIG. 5, but showing the blocking structure of FIGS. 3 and 4, respectively, in operative position and in storage position.

DETAILED DESCRIPTION

Before describing the blocking structure in detail, reference will be made to FIGS. 5 and 6 which, generally, describe the combination of the spring holder and the blocking structure.

FIG. 5 illustrates an essentially tubular housing 8a having tubular side walls 8 and a bottom wall 8b. The bottom wall 8b is formed with an extensive central opening and, for example, welded to the side walls 8; it could also be formed by an in-turned flange, for example, and is provided to form a locating abutment for the lower end of a spiral spring 15. The upper end of the spiral spring 15 bears against a spring plate 7 which, as shown, may be formed as a small locating cone to maintain the spring plate 7 centered within the spiral spring, as well known. A dependent bolt 16 extends through the spring 15, the bolt 16 being threaded to receive a coupling (not shown) to which a load, schematically shown by arrow L, can be attached. To support a suspended load, the housing is secured to a suitable support, for example by a screw or weld connection. If it is desired to support a load from a base, the bolt 16 can be extended, or a coupling secured to a base, and the load placed directly on the upper housing cross plate or platform 8c. Alternatively, the top plate 8c can be formed with an opening similar to that of the bottom plate 8b, and the bolt 16 placed to extend upwardly—with reference to FIG. 5—for placement of a load thereon.

Let it be assumed that the spring holder of FIG. 5 is attached with its top plate 8c to a suitable support, and that a load L is attached to the bolt 16. Depending on the weight being placed on the bolt 16, the spring 15 will compress. If it is desired to block the position of the spring in a predetermined compressed state—for example by pre-compressing the spring, or by leaving the spring uncompressed—a blocking element 1 can be placed through an opening formed in the side wall 8 of the tubular housing 8a, to interfere with movement of the spring plate 7, as will appear. If the element 1 is not to be used, it can be stored in the position shown at 1', where a projecting hanger part 5 of the blocking element 1 is hooked through the opening 8d formed in the side wall 8 of the spring holder. The opening 8d can be in form of a longitudinal slit and, for example, can be offset with respect to another opening 8e, positioned diametrically opposite the opening 8b, to permit different height-adjusted locations of the blocking element.

The spring holder of FIG. 6 is identical to that of FIG. 5, and similar elements have been given the same reference numerals. The structure of FIG. 6 retains a blocking structure 10, as shown in blocking condition, and the structure 10 is also shown in storage condition at the right side of FIG. 6, at 10'. Of course, two such structures 10, 10' can be located on any one of the spring holders, for example for use in other spring holders where an opening such as opening 8d may not be readily accessible. When in storage position, the respective hanger elements 5', 11' of the blocking elements 1', 10' are hooked over the tubular wall 8.

Two embodiments of blocking structures in accordance with features of the present invention are illustrated in FIGS. 1, 2 and FIGS. 3, 4, respectively. Referring to FIGS. 1 and 2; A C-shaped rail 1a forms a frame for holding a plurality of segments or lamelle 2 in form of segmental holding plates (see FIG. 1a) in position. The holding plates or segment 2 are flat metal plates, stacked within the rail 1a. Oppositely positioned longitudinal sides of the segments 2 which, preferably, are rectangular, are formed at the periphery with rectangular notches 2a, into which the internally bent-over edges of the rail 1a can engage. The segments 2 are retained within the rail 1a to be vertically slidable. They have only little play in the longitudinal direction of the rectangular plates 2, but can slide freely vertically within the stack. The rail 1a is formed with upper and lower inwardly extending projections 4, 3, forming end or terminal abutments for the respective plates 2 of the stack, and preventing loss of the plates. In the most simple form, the abutments 3, 4 are punched out from the back wall of the rail, to extend inwardly, as best seen in FIGS. 1 and 2. The upper abutment 4, punched out from the back wall of the rail 1a, is reversely bent and extends outwardly of the plane of the rear wall of the rail 1a to form the hanger 5—see FIG. 2. When not in use, the blocking element 1 thus can be readily placed in the position shown at the right side of FIG. 5, at 1', with the hanger 5 illustrated extending inwardly of the spring holder at 5'.

The number of segments or holding plates 2 located between the abutments 3, 4 in the rail 1 is so dimensioned that the space between the two abutments 3, 4 is not completely filled; the remaining free space corresponds to the thickness of the spring plate 7, as clearly seen in FIG. 2. The blocking device, as seen in FIG. 2, is hooked into the opening 8e of the side wall 8—shown in FIG. 2 reversed left-for-right for ease of illustration—in which the space left between the abutments 3, 4 and the stack of the plates 2 is taken up by the spring plate 7 at a predetermined position, determined by the number of plates or lamellae 2 which are above and below the plate 7. The blocking element can be readily inserted into the opening 8e, by merely being pushed therein, and, once inserted, is retained in position by the force of the spring 15. As can be seen, the spring 15 is blocked against movement in either direction—it cannot compress any further with respect to the downward direction, nor can it expand upwardly. The stack of segments engages the wall 8, adjacent the opening 8e.

The rail 1a is made somewhat longer than the stack of segments 2, and the distance between the abutments 3, 4, so that the rail 1a can readily function as an abutment or stop against the wall 8 of the spring housing. The segments 2 are preferably so dimensioned that they fill the entire width of the slit 8e formed in the housing wall 8; they can all be in vertical alignment, and need not have any specific projecting edges. The stack of segments 2, therefore, is vertically slidable within the rail 1a, leaving space to accept the spring plate 7.

Assembly and blocking of spring: The stack of segments 2 is held in its upper position, for example by the hand of the operator, and an end of the blocking rail 1a, for example the upper end of the blocking rail adjacent the uppermost stack of plates 2, is inserted into the opening 8e of the spring housing. The angle of inclination is suitably so selected that the upper plates extend farther within the housing than the lower region. When the segments 2 which are above the spring disk, at its selected position, engage the spring disk 7, the stack of segments is released by the operator, so that the lower segments will slide downwardly due to their own weight within the rail 1a, and those segments which are not above the spring plate 7 will then hold the spring plate 7. Thereafter, the entire blocking structure 1, that is, the rail 1a with the segments 2 thereon, can be aligned vertically, and pushed into the opening 8e, to assume the position shown in FIG. 2.

The structure has the advantage that the previously necessary measuring of the position of the plate 7 with respect to a datum, for example the bottom, under a predetermined load is no longer necessary. As soon as the load is applied, or the spring 15 is prestressed by a test load, the blocking element can be inserted, and the plates 2 will, inherently and automatically, align themselves to hold the spring plate in the desired position, as shown in FIG. 2.

In the embodiment of FIGS. 1 and 2, the elements were sliding longitudinally non-rotatably within the rail. In the embodiment of FIGS. 3 and 4, the elements are arranged for horizontal sliding in a holder. The holding plates define holding plate surfaces.

Embodiment of FIGS. 3 and 4: The holding plates or segments 9, of essentially rectangular outline, in plan view, are longitudinally slidable. They are formed with lateral notches or recesses 9a, which are longer than the recesses 2a of the segments 2 (FIG. 1). The segment holders are formed by a strip 10a, preferably constructed as a closed-loop band. It may be a strip of sheet metal, welded into a closed loop. The strip 10a holds the stack of holding plates 9 in superposed alignment, the frame or holder 10 fitting into the notches 9a. The blocking structure 10 is narrower than the length of the notches or recesses 9a, to permit sliding movement of the segments 9 in longitudinal direction with respect to the holder frame 10a. This permits sliding of the segments 9 in longitudinal direction. The holding plates 9 are stacked above each other, with just enough clearance to permit ready longitudinal sliding. There is no excess clearance matching the thickness of the spring plate 7.

The strip 10a is formed, at the top and/or at the bottom, with a pair of laterally projecting flaps 10b which limit the insertion movement of the blocking structure 10 within the spring housing—see FIG. 6. A holder strip 11 is secured to the strip 10a, positioned at a suitable distance from the strip 10a and extending downwardly, corresponding to the holder strip 5 of FIGS. 1, 2, to permit the blocking structure 10 to be stored in non-blocking condition, as seen on the right side of FIG. 6 at 10', with the holder being located inside of the spring holder, as shown at 11'. The spring blocking element is inserted, as before, in a suitable lateral opening, for example opening 8e in the side wall 8 of the spring holder. Those segments which are at the level of the spring disk 7 which is to be blocked will be pushed outwardly by the spring plate 7, so that the spring plate 7 is securely retained in position above and below the spring by the respective plates or segments 9, and block movement of the spring plate 7 in both upward as well as downward direction.

The structure in accordance with FIGS. 3 and 4 is particularly easy to use. The longitudinally slidable plates or segments 9 can be immediately inserted within an opening 8e, for example a longitudinal slit, in the housing of the spring hanger—see FIG. 6. Those plates or elements 9 which are in alignment with the spring plate 7, positioned, for example, by a standard prestressing load—will be pushed automatically backwardly, the required number of plates or segments 9 being determined by the thickness of the spring plate 7, and being moved thereby. The blocking structure of FIGS. 3 and 4, thus, can be used with various types of spring hangers having plates 7 of different wall thicknesses, particularly if the plates 9 are made quite thin, so that, even upon a mismatch of plates 9 and the thickness of the spring plate 7, only little play will result, at the most just below the thickness of any one of the plates or segments 9.

FIGS. 5 and 6 illustrate the blocking structure 1 in position, to block movement of the spring, and hence of the spring disk or plate 7. The same or another blocking structure can be stored, out of position and out of operation, on the spring housing, without interfering with vertical movement, as shown at the right side of FIG. 5. The holder 5 can be formed as one punched unit directly from the rail 1a. It may, however, also be a separate element, which is secured to the strip 10a, for example by spot-welding. The holder 11 may be unitary with the insertion limit flaps 10b, and secured to the strip 10a by one or two suitable spot welds.

The blocking structure, for a spring in a spring housing of either embodiment, has the advantage that it is automatically adjustable to any desired position of deflection of the spring, that is, to any desired position of the spring plate 7, the blocking device automatically adjusting itself to the respective position of the spring plate, without any additional measuring or pre-adjustment. When not in use, the element is readily stored.

In the embodiment of FIGS. 1 and 2, the spring plate 7 will place itself in the appropriate position within the stack of elements or segments 2, and will be retained by the elements 2 above and below the spring plate in appropriate position, blocking with respect to movement in either upward or downward direction. The notches 2a can be made long enough to permit sliding movement of the plates or segments 2 with respect to each other, transversely to the longitudinal extent of the rails 1a. Such an arrangement permits blocking the spring plate 7 in only one direction. Those segments or plates 2 which are to be inoperative can be pushed backwardly, into the rail 1a, for example through a rear notch which also forms the holder 5, to permit movement of the spring plate 7 in the direction where the segments 2 have been pushed backwardly. For example, and referring to FIG. 2, the segments or plates 2 below the spring disk 7 can be pushed rearwardly towards the holder 5, thus blocking movement of the spring plate 7 only in upward direction, while permitting downward deflection. The gap between the height of the stack of the plates 2, and the distance between the abutments 3, 4, is matched to the thickness of the spring plate 7. The plates 2, thus, are positioned closely adjacent each other only when the spring plate 7 is inserted, thus substantially facilitating alignment.

One-way longitudinal blocking can also be effected by the structures 10 of FIGS. 3, 4, by manually shifting those segments or plates 9, which are not to effect blocking, in rearward direction.

Both embodiments, FIGS. 1, 2 and FIGS. 3, 4, thus provide for simple handling and permit blocking of the spring plate 7 in any desired position in tiny steps.

The in-turned flanges of the rail 1a provide for excellent retention and positioning of the blocking structure 1 against the outer longitudinal wall 8 of the spring housing. Additionally, the rails locate the plates or segments 2 in properly aligned position. The segments or plates can be formed sturdily and strong since they will be engaged against each other throughout the full width of the plates, and the entire width of the rail 1a can be used to form the abutment surfaces 3, 4. Separate engagement surfaces on the plates with respect to each other thus are not required. The forces acting on the plates due to the reactive force exerted thereagainst by the spring plate 7 thus are readily acceptable, and transferrable to the wall 8 of the spring housing.

The rail 1a, FIGS. 1 and 2, can be made from standard C-rail sections, which are commercial articles. The abutments 3, 4 can then be punched out from the rear wall after assembly of the plates 2 therein. Manufacture of the blocking structure of FIG. 1 is, thus, particularly simple and inexpensive. If it is desired to have the plates or segments 2 move only vertically, then the notches 2a can be matched to the thickness of the in-turned flanges of the rail 1a. It is also possible, however, to utilize a rail 1a with a slidable structure such as shown in FIGS. 3, 4, that is, to utilize plates or segments 9 with the rails 1a, and have the plates or segments arranged for horizontal sliding movement—with respect to FIGS. 1, 2. If so arranged, the plates or segments 2 between the abutments 3, 4 preferably are all in engagement with just enough clearance between the plates segments and the abutments to provide for easy sliding movement. The plates 2, with a space in the stack for the spring plate 7 can also be used with the frame holder band or strip 10a of FIG. 3, although, for such a structure, the sturdier rail 1a of FIGS. 1, 2 is preferred. Ordinarily, the blocking structure is used only temporarily, for example for initial placement of loads, adjustment and calibration, or testing; thereafter, the blocking element will no longer be needed until, for example, it is later on desired to rigidly support the load, for example for repair or maintenance. The blocking structure is self-storing by the holders 5, 11.

The spring plate 7, usually of circular cross section, is preferably formed with one or two radially extending projections 7a, for example diametrically positioned, and fitting within the openings 8d, 8e in the spring housing. These porjections 7a, which extend toward or through the slits 8d, 8e, provide for a radial extension to shift the point at which force is applied to the blocking structure outwardly, so that the force engagement point corresponds, or at least essentially or closely corresponds, to the engagement position of the respective plates 2, 9 with the wall 8 of the spring structure. This arragement, then, substantially reduces application torques and twisting moments applied to the blocking device—in comparison to known structures—since the engagement point at which spring force is applied to the blocking device, and the counter surfaces to accept the force—here the end portions adjacent the slit 8d, 8e in the side walls—are in close proximity and, preferably, in vertical alignment.

Various changes and modifications may be made, and any feature described herein may be used with any of the others in any one of the embodiments, within the scope of the inventive concept.

I claim:

1. Support spring blocking structure (1, 10) for, and in combination with, a spring support,
    wherein the spring support comprises
    means for defining an essentially tubular housing (8, 8a, 8b, 8c);
    a spring (15) located in the housing;
    a spring plate (7) bearing against one end of the spring,
    said means for defining the tubular housing having abutment means (8b) for supporting the other end of the spring;
    means (16) for coupling a load (L) to the spring plate which upon application of the load, tends to deflect the spring from a quiescent position to a deflected position;
    the means for defining the tubular housing being formed with an opening (8e) extending in the direction of deflection of the spring;
    and wherein the support spring blocking structure (1, 10) comprises
    a plurality of superposed holding plates (2, 9), stacked above each other, positionable in interfering relation with respect to the spring plate (7), and movable out of interfering relation with respect thereto;
    and a plate holder structure (1a, 10a) selectively separable from and attachable to said means for defining said essentially tubular housing (8, 8a, 8b, 8c) and engageable in the opening (8e) of the means defining the essentially tubular housing, said plate holder structure securing said holding plates (2, 9) in superposed, stacked relation; and wherein
    said plate holding structure and said housing plates are dimensioned and located for non-rotatable sliding movment of said holding plates in said plate holding structure;
    wherein the holding plates (2, 9) each define a holding plate surface;
    essentially rectangular notches or recesses (2a, 9a) are formed on two opposite regions of the holding plates,
    and wherein the plate holder structure comprises an elongated element extending over the length of the stacked holding plates, and having at least one engagement portion fitting against an edge surface of the plate and within, and engaging said notches or recesses (2a, 9a) of the holding plates.

2. A support spring blocking structure as claimed in claim 1, wherein (FIGS. 3, 4, 6) the holding plates (9) are slidable in the plate holder structure (10a) transversely to the direction of deflection of the spring (15) and essentially parallel to the holding plate surface of the holding plates.

3. A support spring blocking structure as claimed in claim 1, wherein (FIGS. 1, 2) the plate holder structure (1a) has a dimension in the direction of deflection of the spring which is longer than the stack of holding plates (2) by a distance which is at least as great as the thickness of the spring plate (7);
    and wherein the holding plates are slidable in the plate holder structure (1a) in a direction essentially perpendicular to the holding plate surface of said holding plates.

4. A support spring blocking structure as claimed in claim 1, wherein the opening in the means for defining the essentially tubular housing comprises a slit (8d, 8e) providing access from the outside of said means to the interior thereof and hence to the spring and the spring plate (7);
    and wherein the plate holder structure includes abutment surface means for positioning the support spring blocking structure against the outside of said means for defining the essentially tubular housing, with the holding plates extending inwardly thereof for selective positioning in interfering or non-interfering position with respect to the spring plate (7).

5. A support spring blocking structure as claimed in claim 1, wherein (FIGS. 1, 2, 5) the plate holder structure (1a) comprises a longitudinal rail having approximately C-shaped cross section, and surrounding said holding plates (2) in part, the rail being formed with inwardly extending facing flanges engaging in the notches or recesses (2a) of the holding plates.

6. A support spring blocking structure as claimed in claim 5, wherein said rail is formed with internally projecting abutment means (3, 4) for vertical positioning of the plates in aligned, stacked relation.

7. A support spring blocking structure as claimed in claim 6, wherein (FIGS. 1, 2) the plate holder structure (1a) has a dimension in the direction of deflection of the spring which is longer than the stack of holding plates (2) by a distance which is at least as great as the thickness of the spring plate (7);

and wherein the holding plates are slidable in the plate holder structure (1a) in a direction essentially perpendicular to the holding plate surface of said holding plates.

8. A support spring blocking structure as claimed in claim 1, wherein (FIGS. 3, 4) the plate holder structure (10a) comprises a frame formed of flat strip material (10a) fitting into the lateral notches or recesses (9a) of the holding plates (9), and extending about the uppermost and lowermost of the superposed, stacked holding plates.

9. A support spring blocking structure as claimed in claim 8, wherein the width of the strip of the holder structure (10a) is less than the length of the notch or recess (9a) of the respective holding plates to permit sliding movement of the holding plates with respect to the plate holder structure.

10. A support spring blocking structure as claimed in claim 9, wherein (FIGS. 3, 4, 6) the holding plates (9) are slidable in the plate holder structure (10a) transversely to the direction of deflection of the spring (15) and essentially parallel to the holding plate surface of the holding plates.

11. A support spring blocking structure as claimed in claim 1, further including a hanger element (5, 5'; 11, 11') secured to the plate holder structure (1a, 10a) and projecting therefrom and having a portion extending essentially parallel to the holding plates in the superposed, stacked position.

12. A support spring blocking structure as claimed in claim 11, wherein the means for defining the essentially tubular housing includes a longitudinal slit (8d) in addition to said opening (8e), shaped and dimensioned to receive said hanger element (5, 5'; 11, 11').

13. A support spring blocking structure as claimed in claim 1, wherein said plate holder structure additionally includes abutment means adapted to position the support spring blocking structure with respect to the means for defining the housing, when assembled thereto or combined therewith.

14. A support spring blocking structure as claimed in claim 1, further including at least one radially projecting extension (7a), projecting from the spring plate and positioned for engagement between some of said holding plates (2, 9).

15. A support spring blocking structure as claimed in claim 14, wherein the opening (8e) in the means for defining the essentially tubular housing comprises a longitudinal slit, and said extension (7a) extending from the spring plate (7) extends in the direction of said opening for engagement between selected holding plates (2, 9) upon assembly or combination of said support spring blocking structure (1, 10) to said means for defining the essentially tubular housing.

16. A support spring blocking structure as claimed in claim 1, wherein the notches or recesses (2a, 9a) are formed at the periphery of the holding plates (2, 9).

* * * * *